United States Patent
Jobling

(10) Patent No.: US 9,822,429 B2
(45) Date of Patent: Nov. 21, 2017

(54) PROCESS FOR THE PRODUCTION OF A URANIUM TRIOXIDE YELLOWCAKE FROM A URANIAN PEROXIDE PRECIPITATE

(75) Inventor: Glenn Jobling, Regency Park (AU)

(73) Assignee: Adelaide Control Engineers Pty Ltd., Regency Park, South Australia (AU)

( * ) Notice: Subject to any disclaimer, the term of this patent is extended or adjusted under 35 U.S.C. 154(b) by 0 days.

(21) Appl. No.: 13/519,767

(22) PCT Filed: Jan. 7, 2011

(86) PCT No.: PCT/AU2011/000019
§ 371 (c)(1),
(2), (4) Date: Jun. 28, 2012

(87) PCT Pub. No.: WO2011/082454
PCT Pub. Date: Jul. 14, 2011

(65) Prior Publication Data
US 2012/0301374 A1    Nov. 29, 2012

(30) Foreign Application Priority Data
Jan. 8, 2010 (AU) ................. 2010900066

(51) Int. Cl.
C22B 60/00 (2006.01)
C22B 60/02 (2006.01)
C01G 43/01 (2006.01)

(52) U.S. Cl.
CPC .......... C22B 60/0252 (2013.01); C01G 43/01 (2013.01); *C01P 2006/10* (2013.01)

(58) Field of Classification Search
CPC .............................. C01G 43/01; C22B 60/0252
USPC .................................................... 423/3, 260
See application file for complete search history.

(56) References Cited

U.S. PATENT DOCUMENTS

| | | | | |
|---|---|---|---|---|
| 2,975,123 A * | 3/1961 | Head | ................. | F26B 5/005 |
| | | | | 106/504 |
| 4,079,120 A * | 3/1978 | Cole | ................. | C01G 43/025 |
| | | | | 252/636 |
| 4,271,127 A * | 6/1981 | Borner et al. | ................. | 422/159 |
| 4,293,528 A | 10/1981 | Paul | | |
| 4,302,428 A | 11/1981 | Paul | | |
| 4,830,841 A | 5/1989 | Urza | | |
| 5,354,358 A * | 10/1994 | Litz | ................. | C01G 43/01 |
| | | | | 423/2 |
| 2007/0012545 A1 * | 1/2007 | Varney | ................. | B65G 47/71 |
| | | | | 198/370.04 |
| 2008/0025894 A1 | 1/2008 | Lahoda | | |

FOREIGN PATENT DOCUMENTS

WO    2008/101296    *    8/2008
WO    WO 2008-101296 A1    8/2008

OTHER PUBLICATIONS

Merritt, "The Extractive Metallurgy of Uranium," Colorado School of Mines Research Inst. 1971, pp. 427-454.*
International Search Report for PCT/AU2011/000019 dated Feb. 17, 2011.

* cited by examiner

*Primary Examiner* — Steven Bos
(74) *Attorney, Agent, or Firm* — Nixon Peabody LLP; Jeffrey L. Costellia

(57) ABSTRACT

The present invention provides a process for the production of a uranium trioxide yellowcake from a uranium peroxide precipitate, the peroxide precipitate being in the form of a low solids content, uranium rich feed slurry, the process including the stages of: a. thickening the feed slurry to produce a thickener underflow with a solids content in the range of 15 to 50% w/w and a thickener overflow; b. dewatering the thickener underflow to produce a solids cake with a solids content of at least 50% w/w and a dewater overflow; and c. calcining the solids cake at a temperature in the range of 450° C. to 480° C. to produce a calcined uranium trioxide yellowcake.

13 Claims, 1 Drawing Sheet

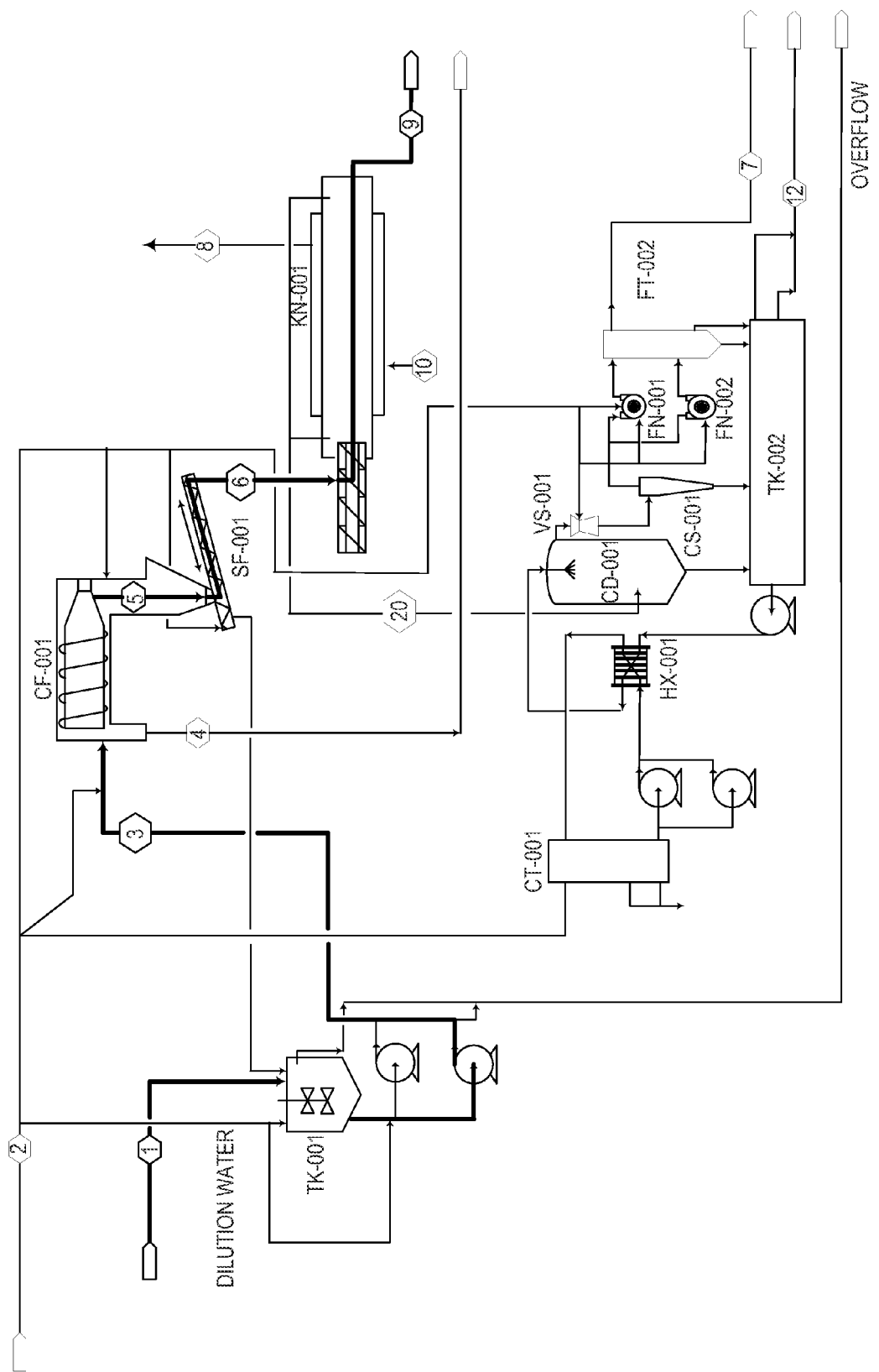

PROCESS FOR THE PRODUCTION OF A URANIUM TRIOXIDE YELLOWCAKE FROM A URANIAN PEROXIDE PRECIPITATE

RELATED APPLICATIONS

This international patent application claims priority from Australian provisional patent application 2010900066 lodged on 8 Jan. 2010, the specification of which is hereby incorporated by reference.

FIELD OF THE INVENTION

The present invention relates to the production of yellowcake from uranium bearing ores, the yellowcake being an intermediate product (uranium trioxide ($UO_3$)) used for subsequent conversion or enrichment to form commercial amounts of uranium.

The present invention relates particularly to that part of the overall process that takes a uranium precipitate and processes it to form a uranium trioxide yellowcake, and more specifically relates to a process for the production of a uranium trioxide yellowcake from a uranium precipitate that has been produced through the use of a hydrogen peroxide based precipitation step.

BACKGROUND OF THE INVENTION

The mining and processing of uranium bearing ores generally always utilizes a leaching process (and thus the use of a lixiviant, such as an aqueous carbonate-bicarbonate solution or an acid solution) to leach the uranium from its accompanying gangue material in the ore body. Such leaching operations may be conducted in conjunction with surface milling operations where the uranium is mined (often in open-pits) and then crushed and blended prior to leaching, or by using in-situ leaching techniques in which the lixiviant is introduced into a subterranean ore deposit and then recovered through suitable extraction systems.

The pregnant lixiviant produced during the leaching process is then processed further to concentrate the uranium therein. This further processing includes a variety of possible chemical treatments, which are usually determined by the characteristics of the specific ore being processed and also its method of extraction. For example, such further processing might include an anionic ion exchange process or solvent extraction. Regardless of the process adopted, a relatively concentrated uranium solution is produced, generally called the "eluate", which must then be treated to precipitate a uranium compound, often referred to simply as "uranium" or a "uranium precipitate".

Various precipitation techniques are available, one of which uses hydrogen peroxide, that are able to precipitate a uranium rich slurry for subsequent washing, dewatering and drying/calcining to produce a dry and stable uranium concentrate that can be relatively easily transported. In this respect, the downstream conversion facilities for such uranium concentrates are invariably not located near the sites of the uranium ore bodies, and thus the safe transportation, often over long distances, of the uranium concentrates renders this dry and stable form an ideal intermediate point in the overall uranium production process.

For the sake of clarity in this specification, some terms need to be defined. This is particularly the case as skilled addressees will often use the same term to represent a product at different stages in the process.

For example, the uranium concentrate referred to above as a "uranium rich slurry", produced directly from a precipitation process, is sometimes referred to in the art as "yellowcake", as is the dry and stable form of the uranium concentrate that exists after the subsequent washing, dewatering and drying/calcining processes. However, throughout this specification the term "uranium precipitate" will be used to describe the uranium rich slurry that is produced from the precipitation process, and where the uranium precipitate has been produced through the use of a hydrogen peroxide based precipitation process, the subsequent precipitate obtained will be referred to as a "peroxide precipitate".

The term "yellowcake" will be used to describe the dry and stable form of the uranium concentrate produced after the uranium precipitate has been subjected to whatever subsequent washing, dewatering and drying/calcining processes are required. In this respect, it should also be appreciated that the composition of yellowcake is variable and depends upon the ore body, the lixiviant, the subsequent precipitation conditions, and the subsequent washing, dewatering and drying/calcining processes. It can consist of a mixture of, amongst other things, several ammonium-uranium-oxygen compounds, and can take different forms based upon its majority composition.

Therefore, it should be appreciated that a reference to "yellowcake" simpliciter throughout this patent specification is not to be limited only to one form of yellowcake. Indeed, yellowcake that is uranium peroxide based ($UO_4 \cdot nH_2O$, where n can vary from 2 to 4) is increasing in popularity, and this yellowcake is often referred to as a "peroxide" yellowcake. It is also possible to produce a yellowcake that is uranium trioxide based, and which is often referred to as a "trioxide" yellowcake. For the sake of simplicity and clarity, throughout this patent specification when reference is made to just "yellowcake", the term is being used to cover all forms and types of yellowcake, with more specific references then being made to, for example, "trioxide yellowcake" or "peroxide yellowcake" where necessary.

The price paid for yellowcake by yellowcake conversion facilities is generally dependent upon the yellowcake's purity levels (purity in terms of its concentration of, for example, whichever form of uranium is required, such as the concentration of the uranium peroxide). Therefore, producers of a peroxide yellowcake generally aim to maximize the concentration of the uranium peroxide in the yellowcake, which of course requires (amongst other things) the level of impurities in the yellowcake to be minimized, and the moisture content of the yellowcake to be minimized. In terms of moisture content, ideally it would be reduced to less than about 1 wt % for any yellowcake.

Typically, the processes that have been adopted to dry a peroxide precipitate to form a peroxide yellowcake have required large quantities of water which, given the often remote locations of the uranium ore deposits, introduces significant cost issues. These processes generally involve the washing of the precipitate, which is in the form of a slurry, to remove undesirable water soluble impurities, followed by the concentration of the slurry and the subsequent reduction of its moisture content before it is packaged for sale as yellowcake.

The washing has traditionally been accomplished in a number of ways. For example, the washing function has been accomplished in a filter press or a wash thickener, avoiding the need for the addition of flocculent and improving the liquour/product contact for removal of impurities, resulting in a solids cake with a high solids concentration (greater than about 50%). The solids cake has then required moisture removal to produce the powdered peroxide yellowcake product suitable for sale for further processing. There have generally been two alternatives used, namely a rotary vacuum dryer and a continuous screw dryer, both operating at reasonably low temperatures to heat the product to about 150° C. or below, to produce a dried peroxide yellowcake.

However, with yellowcake shipment costs in many countries being based on volume rather than weight, the relatively low bulk density of the peroxide yellowcake (at about 1.4 kg/L) introduces higher transport costs than would be the case if the same peroxide precipitate could be used to produce the higher bulk density trioxide yellowcake (at about 1.8 kg/L). In the latter case, this results in transport cost savings in countries where, for example, only single level stacking of the filled drums in shipping containers is allowed. Therefore, within certain limits, even a higher production cost for the trioxide yellowcake would still be acceptable due simply to the lower transport costs of the trioxide yellowcake.

One attempt at producing the trioxide yellowcake from a peroxide precipitate has been described by Mobil Oil Corporation in U.S. Pat. No. 4,302,428 (to James M Paul). In this document, Paul states that the drying of a peroxide precipitate at low temperatures in the range of 100° C. to 300° C. results in dehydration to form a peroxide yellowcake, and that the calcining of a peroxide precipitate at temperatures in the range of 700° C. to 900° C. results in thermal decomposition to form a $U_3O_8$ yellowcake. However, Paul states that, while the trioxide yellowcake is theoretically able to be produced at temperatures in the range of 200° C. to 500° C., at some temperatures within that range (specifically between the temperatures of 300° C. and 500° C.), the conversion is accompanied by the undesirable evolution of chlorine gases.

In order to avoid the undesirable evolution of chlorine gas in such a calcining step, and still with the aim of producing the trioxide yellowcake (and not the peroxide yellowcake), Paul directs the reader to avoid temperatures above 100° C., and to instead react the peroxide precipitate with a reducing agent (such as sulfur dioxide gas) at a temperature at about room temperature, but certainly less than 100° C., in order to directly chemically convert the uranium peroxide to uranium trioxide by virtue of the reaction:

$$UO_4 + xH_2O + SO_3^{2-} \rightarrow UO_3 + SO_4^{2-} \cdot xH_2O$$

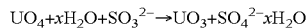

Paul then suggests the subsequent washing of the reduction reaction product with water (to permit removal of the water soluble salts such as sodium chloride), followed by drying of the washed slurry at a moderate temperature of less than 200° C. to form a relatively high purity trioxide yellowcake.

In a contemporaneous Mobil Oil Corporation patent, namely U.S. Pat. No. 4,293,528 (also to James M Paul) that describes efforts to thermally decompose a peroxide precipitate to form an oxide yellowcake (not a peroxide yellowcake), Paul further describes what additional reagents would be required when calcining at higher temperatures such as 300° C. (presumably to form a trioxide yellowcake), and 750° C. and 760° C. (presumably to form a $U_3O_8$ yellowcake). Indeed, Paul makes it clear that a reducing agent is required in order to react with the free oxygen evolved during calcination, again in order to retard the evolution of chlorine gas. The reducing agent is said to be ammonia or an ammonia producing compound such as ammonium carbonate.

The present invention aims to provide a process for the production of a trioxide yellowcake from a peroxide precipitate, which process does not require the addition of a reduction step nor the use of reducing agents (such as the ammonia or sulfur dioxide gases mentioned above) required for that step.

Before turning to a summary of the present invention, it must be appreciated that the above description of the prior art has been provided merely as background to explain the context of the invention. It is not to be taken as an admission that any of the material referred to was published or known, or was a part of the common general knowledge in Australia or elsewhere.

SUMMARY OF THE INVENTION

The present invention provides a process for the production of a uranium trioxide yellowcake from a uranium peroxide precipitate, the peroxide precipitate being in the form of a low solids content, uranium rich feed slurry, the process including the stages of:

a. thickening the feed slurry to produce a thickener underflow with a solids content in the range of 15 to 50% w/w and a thickener overflow;

b. dewatering the thickener underflow to produce a solids cake with a solids content of at least 50% w/w and a dewater overflow; and c. calcining the solids cake at a temperature in the range of 450° C. to 480° C. to produce a calcined uranium trioxide yellowcake.

The feed slurry will sometimes contain one or more water soluble impurities, which impurities will typically be one or more of the normal chloride, sulphate or nitrate impurities. In a preferred form, the impurities are washed from the feed slurry prior to calcination, such as during either or both of the thickening and dewatering stages. In one form, the washing will occur as a part of the dewatering stage, such as by the use of additional wash water during dewatering, so that the impurities (or at least a substantial portion of the impurities) exit the process with the dewater overflow.

Indeed, in a preferred form the process includes the recycling of the dewater overflow back to the thickener in order to minimize the amount of uranium lost in the liquid removed from the feed slurry.

Before turning to a more detailed description of the present invention, various terms that will be used need to be further explained. For example, the above statement refers to a "low solids content, uranium rich feed slurry". The term "low solids content" is used herein to mean a feed slurry having a solids content below about 15% (w/w). Typically, the solids content of the feed slurry will be within a reasonably normal operating range of 2 to 15% (w/w).

Further, the term "uranium rich" is a term used to describe, for example, a concentrated uranium peroxide precipitate produced from a hydrogen peroxide based precipitation step. The concentrated peroxide precipitate will typically contain in excess of about 60% (w/w) uranium peroxide. With this in mind, it will of course be appreciated that it is the solids component of the "low solids content, uranium rich feed slurry" that is uranium rich.

Further still, by the terms "slurry" and "solids cake" the following is meant. A "slurry" is typically a liquid containing suspended solids. Normally, a peroxide precipitate slurry, for example, could vary from 1% solids to 40% solids, and still be regarded as a slurry in the traditional sense. A "solids cake" in this specification is the solids discharge typically produced by centrifuges and filters, which is a high solids content slurry, typically with a solids concentration greater than 40% (w/w), but normally as high as 60 to 80% (w/w).

Finally, the above broad statements of the invention result in the production of a "calcined uranium trioxide yellow-cake". The term "calcined" in relation to the yellowcake is used herein to mean a yellowcake that has undergone a thermal decomposition (rather than a chemical reaction) from the peroxide ($UO_4.nH_2O$) to the trioxide ($UO_3$). The calcined yellowcake is "dried" in that it will have a solids concentration greater than about 98% (w/w). Indeed, such a dried trioxide yellowcake will typically have a solids concentration of between about 98% (w/w) and 100% (w/w), and has the appearance of a fine powder (typically of a burnt orange colour).

Returning to a general description of the present invention, the first stage of the process is preferably conducted in a thickener. The thickener may be any type of thickener that acts to separate solids from a liquid by gravity sedimentation, so as to produce a settled underflow that accumulates at the bottom of the thickener, and a clarified overflow that can be taken from the upper part of the thickener.

The use of a thickener as the preferred type of thickening means is advantageous for several reasons. A thickener provides a large residence time for settling during plant upsets, and provides the option of adding flocculant to assist with settling when required. A thickener is also able to notionally function as a storage device during plant maintenance or for unexpected shutdowns.

The size of the thickener is typically more important than the type of thickener used, as most thickeners generate better results through increased residence times, although in some situations it will be the footprint available (or economics alone) that will dictate the size and type, rather than the optimum residence time for settling. However, the rate of settling in a thickener is also dependent on the size (and size distribution) of the peroxide precipitate. Sometimes, especially during or just after plant shutdowns, the precipitation circuit may become unsettled which may cause the peroxide precipitate to be at a less than optimum settling size, requiring an increased settling time and making a larger thickener more advantageous. Furthermore, it may be beneficial to operate with two thickeners in series rather than one large thickener.

The thickener overflow may contain uranium present as solids and also dissolved in solution, such as for example 30-50 ppm of $U_3O_8$ equivalent of about 1.05 g/mL density and at a pH of approximately 4.5, with some residual sulphuric acid, sulphates and chlorides. The overflow discharged from the thickener may thus be re-directed to a, for example, pre-leach thickener for recycling so that any uranium contained therein is not lost to tailings.

In addition to the thickener overflow, the first stage also produces a thickener underflow, which preferably has a solids content in the order of 15% to 50% (w/w), or possibly 30% to 50% (w/w) and ideally at about 30% (w/w). The solids of course will have a high uranium content by way of the retained (and now thickened) uranium precipitate, and as much as 60% or more of the solids may be provided by the uranium peroxide. The thickener underflow may also contain some of the water-soluble impurities mentioned above, such as chlorides, nitrates and sulphates.

To remove water soluble impurities the thickener underflow can be pumped to a wash thickener. The thickener underflow, as mentioned above ideally at 30% solids (w/w) is preferably diluted to about 4% solids (w/w) with clean water in the wash thickener. The diluted slurry may then be thickened again to about 30% solids (w/w) in the wash thickener with the overflow from the wash thickener containing the water soluble impurities.

The thickener underflow may also contain insoluble impurities that are not easily removed at this stage and that are usually controlled via extraction/ion exchange and tight precipitation controls. Indeed, in some forms of uranium processing there may be a precipitation stage included in advance of the traditional uranium precipitation step referred to above, introduced in order to remove other impurities such as iron, molybdenum, and vanadium (depending upon the composition of the ore being processed). For example, in this extra precipitation stage, lime can be added to precipitate sulphates, hydroxides and iron. In this respect, hydrogen peroxide has become preferred for the traditional precipitation step as it tends to produce a more pure product than other methods, and it can prevent the co-precipitation of other metals that might have occurred otherwise. Indeed, many converter specifications have become tighter in recent years, hence a preference for hydrogen peroxide precipitation has developed due to its purer product compared to other methods.

In relation to the means for dewatering the thickener underflow, it is envisaged that equipment such as a filter press, a pressure filter or a centrifuge would be used. The use of such units as the dewatering means is at least partly dependant upon the presence of any water soluble impurities in the slurry feed. In this respect, filter presses and pressure filters provide a wash stage during filtering that washes the thickener underflow, ideally with an amount of water that is sufficient to remove all of the water soluble impurities present, the extent to which this is required being dependent upon the composition and amount of the impurities initially, and also upon the ultimately required purity levels of the calcined yellowcake produced by the process of the invention. A short or long wash stage is possible with this circuit set-up, making it easily adjusted for site specific levels of impurities in the peroxide precipitate.

One form of acceptable pressure filter is an automatic pressure filter of the type recently adopted in some high tonnage mining operations. Automatic pressure filters tend to be highly efficient and completely sealed, hence assisting to avoid problems with dusting or radiation. Such a filter will ideally be a semi continuous machine, as opposed to conventional filter presses or any other pressure filters such as candle, horizontal plates or vertical leaf filters that operate batch-wise. Such a filter will ideally be able to operate on a cycle time as low as 6-7 minutes, which is very close to a continuous dewatering cycle.

In one form, the automatic pressure filter will include plates that are stacked horizontally to form a tower, thus changing the direction of filtration from horizontal to vertical. The plates ideally form chambers into which the slurry is fed under pressure to the gap between a rubber diaphragm and the cloth woven filtering belt. Once a cake is formed, the diaphragm squeezes the cake to remove the residual moisture prior to washing, if required, or cake discharge. At this stage, the plates stack is tightly closed and the cloth belt remains stationary. Once the filtration cycle is completed the stack opens, the cloth indexes one pitch forwards, and the solids cake moves over rollers and discharges to chutes for further processing.

A pressure filter preferably produces a solids cake with a solids content greater than 65% (w/w) and as high as 80% (w/w), and with levels of water soluble impurities (at least in terms of sulphates and chlorides) that are in an acceptable range for the subsequent requirements for the desired trioxide yellowcake, as will be discussed below.

Alternatively, the dewatering means may be a filter press. A filter press preferably consists of a head and tail end with a follower that contains a pack of vertical rectangular plates that are supported by side or overhead beams. The head serves as a fixed end to which the feed and filtrate pipes may be connected, and the follower moves along the beams and presses the plates together during the filtration cycle by a hydraulic or mechanical mechanism. Each plate is dressed with filter cloth on both sides and, once pressed together; they form a series of chambers that depend on the number of plates. The plates generally have a centred feed port that passes through the entire length of the filter press so that all the chambers of the plate pack are connected together. Likewise, four corner ports connect all the plates and collect the sludge and wash filtrates in a "closed discharge" towards outlets that are located on the same side as the feed inlet.

Like a pressure filter, a filter press is suited to processes with high impurities as washing of the cake can be performed. In this respect, clean water may be passed over the dried cake to remove water soluble impurities and the filtrate can be monitored for conductivity—when the conductivity is equal to that of clean water, then the wash cycle is complete.

Alternatively, the dewatering means may be a centrifuge. Indeed, in the absence of any water soluble impurities (namely, those that tend to require removal prior to dewatering in a wash thickener, or where the precipitate has low levels of impurities) a centrifuge is the preferred form for the dewatering of the slurry. A centrifuge is generally easier to operate, is less maintenance intensive and is ordinarily totally enclosed, significantly lowering the radiation exposure and health and safety issues to operators.

A centrifuge is an apparatus which separates the solid and liquid phases of the feed slurry according to the difference in specific gravities and/or particle sizes. A centrifuge will produce a centrate (the liquid discharge, referred to above as a "dewater overflow") and a dewatered or thickened solids cake. A suitable apparatus generally includes two rotating components, a bowl and the screw conveyor. These two components ideally rotate in the same direction at slightly different speeds. The feed zone is at the cylindrical end of the apparatus, and the solid and liquid phases travel in the same direction along the bowl body. The liquid is then captured in return tubes and discharged back at the feed end of the apparatus. As mentioned above, a centrifuge may be advantageous in some situations due to their relative ease of operation and maintenance, particularly in relation to the processing of peroxide precipitates with little or no water soluble impurities.

In relation to the solids cake produced by the dewatering means (irrespective of whether it might be a filter press, a pressure filter or a centrifuge), the solids cake is preferably transferred from the dewatering means to a bi-directional conveyor (such as a screw conveyor) that is capable of being controlled to discharge either to a calcining apparatus, such as a kiln, or to a yellowcake storage tank. The purpose of this alternative discharge arrangement is to allow the dewatering means to remain in operation during temporary shut-downs of the calcining apparatus or to recycle the solids cake back to the dewatering means during plant start up or should the solids cake quality become off specification.

The solids cake from the dewatering stage will normally be a sticky, non-free-flowing product, with a "tooth-paste" like consistency, typically with a solids content of at least 50% w/w.

In a preferred form, the calcining apparatus will be a kiln and will preferably be an indirectly heated kiln, such as an indirectly heated rotary kiln. In this respect, it will be appreciated that an indirectly heated kiln is one that has its heat source separated from the solids cake and any off-gases produced from the solids cake, in the preferred form by a rotating cylinder. In contrast, a directly heated kiln would have its heat source, which consists of products of combustion in the form of a flame envelope and hot gases, in contact with the solids cake and any off-gases. An indirectly heated, horizontal rotary kiln is most preferred as the performance of horizontal rotary kilns is typically not adversely affected by the vagaries of feed moisture, and horizontal rotary kilns are capable of handling 'sticky' product that tends to attach to a kiln surface allowing it to more readily pass through the kiln.

Additionally, the preferred form of an indirectly heated kiln will ideally be a sealed kiln to assist with the final processing of any radioactive off-gas products and dust. In this respect, indirectly heated kilns with sealing systems prevent interchange between their internal atmosphere and local ambient conditions as they are operated under negative pressure. In addition, the total volume of process off-gas from an indirectly heated rotary kiln is very small when compared with a direct-fired unit, allowing for a less expensive and smaller off-gas system for meeting local, state and federal environmental regulations for dust emissions.

In a preferred form, the kiln off-gas will pass through a large spray condenser to cool and assist in condensing the vapour prior to it passing through a venturi scrubber and filtration system. Apart from cooling the off-gas, the spray condenser will also remove the bulk of the dust load from the off-gas stream. The entrained dust and condensed vapours may then be collected in a seal tank.

The cooled off-gas may then pass through a venturi scrubber and then a cyclonic separator where large water vapour droplets and fine solids can be removed from the off-gas stream discharging to the seal tank. A liquid ring vacuum pump may be used to draw the off-gas from the kiln. The discharge from the vacuum pump may pass through a fine mist eliminator to remove small liquid droplets and any entrained dust.

Calcined product from the kiln preferably discharges by gravity into a storage hopper incorporating any known type of drum filling and weighing system from which the calcined trioxide yellowcake is packaged for sale. As mentioned above, the composition and moisture content of the calcined trioxide yellowcake will typically be dependent upon the composition of the feed slurry used in the process, which in turn will be dictated by the composition of the original uranium bearing ores and also the nature of the processing steps adopted to produce the feed slurry. However, in general terms, it is expected that the calcined trioxide yellowcake produced by the present invention will be a free-flowing yellowcake powder with a moisture content in the order of 0% to 2% (w/w).

BRIEF DESCRIPTION OF THE DRAWINGS

Having briefly described the general concepts involved with the present invention, a preferred embodiment will now be described that is in accordance with the present invention. However, it is to be understood that the following description is not to limit the generality of the above description.

In the drawings:

FIG. 1 is a schematic flow diagram showing a process for the calcining of uranium peroxide yellowcake in accordance with a first preferred embodiment of the present invention.

DESCRIPTION OF A PREFERRED EMBODIMENT

FIG. 1 provides a flow diagram of a preferred embodiment of the process of the present invention, being a process for the calcining of a uranium peroxide precipitate to form a uranium trioxide yellowcake. The main product flow path has been bolded in FIG. 1 to distinguish it from ancillary flow paths and little description is provided (or is necessary) for these ancillary flow paths, including paths that show: movement of process water (2) through, amongst other things, the storage tank (TK-001), the cooling tower (CT-001) and the heat exchanger (HX-001); and movement of the combustion and exhaust gases (8) from the kiln (KN-001).

The main product flow path shows a low solids content, uranium rich feed slurry (1) of the uranium peroxide type having been processed through a conventional thickener (not shown). In this embodiment, the underflow from the thickener, being the thickened slurry (1), will have a solids content in the range of 15 to 50% solids by weight. In this respect, it will be noted that the above description of general aspects of the invention, and the subsequent description of this preferred embodiment, generally refer only to ideal ranges of various normal operating parameters of a process such as that of the invention, such as for temperatures, compositions and concentrations. A skilled addressee will understand the wide variation that exists in the normal operation of a processing plant, dependent upon the type of feed material and its characteristics, and thus the wide variation that must be allowed for when describing preferred operating parameters for an invention of this type.

The dewatering means in the present invention is a centrifuge, a pressure filter or a filter press that separates the solid and liquid phases of the feed slurry. In this embodiment, the dewatering means is a centrifuge (CF-001) that receives thickened slurry (1) via stream (3) from a storage tank (TK-001). In the centrifuge (CF-001) the separation is performed according to specific gravity differences and/or particle size. In this embodiment, the centrifuge (CF-001) produces a centrate (4) (being the dewater overflow referred to in the above general description, and which is essentially a water discharge) that is recycled back to the thickener (not shown) via stream (4), and a solids cake (5), being the solid phase formed in the centrifuge (CF-001), which is essentially the dewatered solids.

The centrifuge (CF-001) consists of a fixed base or casing which carries a rotating element and its drive motor, the details of which are not illustrated in the flow diagram of FIG. 1. The rotating element (or rotor) is preferably made up of a cylindrical section (or bowl) where the liquid is clarified and a conical section (or beach) from where the solids are conveyed out of the liquid by, for example, a screw conveyor (a scroll) inserted into the cylindrical section through an open end of the conical section. Centrifuges of this type are sometimes referred to as decanter centrifuges, solid bowl centrifuges or scroll centrifuges.

The feed slurry is preferably introduced to the centrifuge (CF-001) at an infeed end of the rotating element through a stationary feed tube. The centrifugal force caused by the rotation of the cylindrical section of the centrifuge (CF-001) results in the formation of a continuous solid layer over the inside surface thereof. As will be appreciated, because of the centrifugal forces created by the rotation, the heavier particles will move towards the wall of the cylindrical section, leaving the lighter solids and liquid in a liquid phase (the centrate) in the inner section of the rotating layer. The heavier particles form the dewatered solids cake (5) mentioned above are preferably then transferred by the internal screw conveyor, from the cylindrical section via the conical section, which forms a barrier to the transfer of the liquids, to a solids discharge port.

The centrate preferably flows in the same direction as the dewatered solids cake and returns to the liquid feed end of the cylindrical section of the rotating element of the centrifuge (CF-001) via return tubes, to where it discharges over adjustable weir plates. The centrate and the solids cake can then be collected in separate compartments of the casing of the centrifuge (CF-001), from which they fall by gravity into their respective discharge chutes (all of which occurs internally in the centrifuge (CF-001)).

The centrate (4) discharged from the centrifuge (CF-001) is directed to the thickener (not shown) to prevent the loss of any yellowcake precipitate that might remain in the centrate (4) from the liquid phase, or may alternatively be sent back to a leach (also not shown) if it contains large quantities of impurities. The liquid phase may be able to be reused as process water, depending upon its impurity levels It should also be noted that if the dewatering means were a filter press or a pressure filter instead of a centrifuge, and a wash cycle was thus required, then a conductivity probe may be used to monitor conductivity in the filtrate (the dewater overflow) to determine when water soluble impurities such as chlorides and sulphates have been reduced to an acceptable level. When the conductivity in the filtrate reduces it is implied that the impurities have been removed from the solids cake. The actual conductivity will be determined by the type and number of impurities and by the required convertor specification.

Indeed, it will be appreciated that at this point, the solids cake (6) may have levels of impurities (in terms of water soluble impurities) that will be in an acceptable range for the subsequent requirements for the desired yellowcake.

Before turning to a more specific description of the kiln (identified as KN-001 in FIG. 1), it should be noted that the bi-directional screw conveyor (SF-001) is also ideally able to recycle the dewatered solids cake (6) back through the dewatering stages should its impurity content exceed that desired for the process or for maintenance shutdowns of the kiln (KN-001) or process upsets, or during start-up and shut-down operations when the cake is out of specification.

In relation to the operation of the kiln (KN-001), the solids cake (6) enters the kiln (KN-001) at a minimum solids concentration of about 50% w/w. Heat is applied to the solids cake in the kiln (KN-001), either electrically or using fossil fuels (10) to evaporate the remaining water (both free water and some bound water), and the evaporated water is drawn out of the kiln (KN-001) in the off gas (20) using liquid ring vacuum pumps (FN-001 and FN-002). The kiln (KN-001) is shown as a horizontal rotary kiln that is indirectly heated and that includes a sealing system to prevent interchange between its internal atmosphere and local ambient conditions as they operate under negative pressure.

The off gas (20) from the kiln (KN-001) is passed through a large spray condenser (CD-001) to cool and condense the vapour prior to passage through a venturi scrubber (VS-001). Apart from cooling the off-gas, the spray condenser (CD-001) removes the bulk of the dust load from the off-gas stream and passes it to a seal tank (TK-002). The cooled off-gas from the spray condenser (CD-001) passes through the venturi scrubber (VS-001) and then a cyclonic separator (CS-001) where large water droplets and fine solids are removed from the gas stream and discharged to the seal tank (TK-002), for eventual flow through to a sump via stream (12).

The liquid ring vacuum pumps (FN-001 and FN-002) used to draw the off gas (20) from the kiln (KN-001) maintain a negative pressure in the kiln (KN-001) preventing the escape of any off-gas generated therein.

After passage through the spray condenser (CD-001) and the venturi scrubber (VS-001), the discharge from the vacuum pumps (FN-001 and FN-002) passes through a fine mist eliminator (FT-002) to remove small liquid droplets and any entrained dust (for discharge to the seal tank (TK-002)), subsequently allowing clean air (7) to be removed to a baghouse (not shown).

Returning to a description of the kiln (KN-001), the solids cake (6) produced by the centrifuge (CF-001) in this embodiment is of course calcined in the kiln (KN-001) to produce calcined uranium trioxide yellowcake (9), being the final calcined yellowcake product.

By way of explanation, and without wishing to be bound by the theory, in the kiln (KN-001) the solids cake (6) (of course, containing water and solids, and moving through heat zones within the kiln) is gradually heated to a typical temperature within the range of from about 100° C. to about 145° C. As the solids cake (6) is heated, it passes through a boiling zone as the water approaches its boiling temperature where the solids cake resembles a pot of slowly boiling "porridge". Once the boiling point of the water is reached, excess water vapour (free water that is not bound) is evaporated and drawn away from the kiln (KN-001) by the off gas system mentioned above, which preferably maintains the kiln (KN-001) under a slight vacuum. That is, to this point, the reaction is simply represented as moving from $UO_4.2H_2O$ plus water to $UO_4.2H_2O$ plus about 1% moisture.

Typically, beyond about 150° C. thermal decomposition of the uranium peroxide begins, with gradual conversion to the probable composition of $UO_{3.5}.H_2O$ at about 290° C. Further heating to a temperature within the range of from about 450° C. to about 480° C. completes the dehydration and the formation of $UO_3$ with the removal of the bound $H_2O$. By about 480° C., the product bulk density has increased from about 1.5 kg/L (dried at 145° C.) to about 1.85 kg/L.

The overall reaction in the kiln can then be designated in the following manner:

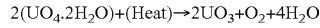

$$2(UO_4.2H_2O)+(Heat) \rightarrow 2UO_3+O_2+4H_2O$$

The final calcined uranium trioxide yellowcake product (9) from the kiln (KN-001) preferably discharges by gravity into a storage hopper (not shown) incorporating any known type of drum filling and weighing system from which the calcined uranium trioxide yellowcake is packaged into drums.

In conclusion, it must be appreciated that there may be other variations and modifications to the configurations described herein which are also within the scope of the present invention.

The invention claimed is:

1. A process for production of uranium trioxide yellowcake from a uranium peroxide precipitate, the uranium peroxide precipitate being in the form of a low solids content, uranium rich feed slurry, the process including the stages of:
    a. thickening the feed slurry to produce a thickener underflow with a solids content in the range of 15 to 50% w/w and a thickener overflow;
    b. dewatering the thickener underflow to produce a solids cake with a solids content of at least 50% w/w and a dewater overflow;
    c. calcining the solids cake at a temperature in the range of 450° C. to 480° C. to produce a calcined uranium trioxide yellowcake; and
    d. washing the feed slurry to remove water soluble impurities while monitoring the dewater overflow with a conductivity probe to determine when the water soluble impurities have been reduced to an acceptable level.

2. A process according to claim 1, wherein the washing of water soluble impurities from the feed slurry occurs during dewatering so that at least a substantial portion of the water soluble impurities exit with the dewater overflow.

3. A process according to claim 1, wherein the process includes recycling dewater overflow back to the thickener.

4. A process according to claim 1, wherein the dewatering occurs in a filter press, a pressure filter or a centrifuge.

5. A process according to claim 4, wherein the dewatering occurs in an automatic pressure filter operating semi-continuously.

6. A process according to claim 4, wherein the dewatering occurs in a centrifuge.

7. A process according to claim 1, wherein the solids cake is transferred from dewatering to a bi-directional conveyor that is capable of being controlled to discharge either to calcination or back to dewatering.

8. A process according to claim 1, wherein calcination occurs in an indirectly heated kiln.

9. A process according to claim 8, wherein the kiln is a horizontal rotary kiln.

10. A process according to claim 8, wherein the kiln is a sealed kiln.

11. A process according to claim 1, wherein the solids cake has a solids content of greater than 50% w/w.

12. A process according to claim 1, wherein the solids cake has a solids content of greater than 65% w/w.

13. A process according to claim 1, wherein the process does not include a reduction step or reducing agents.

* * * * *